(12) United States Patent
Guo et al.

(10) Patent No.: US 8,856,373 B2
(45) Date of Patent: Oct. 7, 2014

(54) ADMISSION CONTROL FOR PERFORMANCE AWARE PEER-TO-PEER VIDEO-ON-DEMAND

(75) Inventors: Yang Guo, Plainsboro, NJ (US); Bankim B. Patel, Hillsborough, NJ (US); Saurabh Mathur, Monmouth Junction, NJ (US); Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 410 days.

(21) Appl. No.: 12/308,461

(22) PCT Filed: Jun. 27, 2006

(86) PCT No.: PCT/US2006/024977
§ 371 (c)(1),
(2), (4) Date: Dec. 15, 2008

(87) PCT Pub. No.: WO2008/002298
PCT Pub. Date: Jan. 3, 2008

(65) Prior Publication Data
US 2010/0241747 A1 Sep. 23, 2010

(51) Int. Cl.
*G06F 15/16* (2006.01)
*H04N 7/173* (2011.01)
*H04L 12/927* (2013.01)
*H04L 12/911* (2013.01)
*H04L 12/54* (2013.01)
*H04N 21/218* (2011.01)
*H04N 21/239* (2011.01)
*H04N 21/472* (2011.01)
*H04N 21/24* (2011.01)

(52) U.S. Cl.
CPC .......... *H04N 7/17318* (2013.01); *H04L 47/805* (2013.01); *H04L 47/781* (2013.01); *H04L 12/5695* (2013.01); *H04N 21/21815* (2013.01); *H04L 47/745* (2013.01); *H04N 21/2396* (2013.01); *H04N 21/47202* (2013.01); *H04L 47/822* (2013.01); *H04N 21/2402* (2013.01)
USPC .......................................... 709/231; 725/105

(58) Field of Classification Search
USPC .................................................. 709/222–227
See application file for complete search history.

(56) References Cited

U.S. PATENT DOCUMENTS

| | | | |
|---|---|---|---|
| 6,801,501 B1 | 10/2004 | Knightly et al. | |
| 7,362,776 B2 * | 4/2008 | Meier et al. | 370/468 |
| 2005/0002405 A1 | 1/2005 | Gao | |
| 2005/0041670 A1 * | 2/2005 | Lin et al. | 370/395.21 |
| 2006/0146792 A1 * | 7/2006 | Ramachandran et al. | 370/352 |
| 2006/0268702 A1 * | 11/2006 | Ali et al. | 370/230 |
| 2008/0151807 A1 * | 6/2008 | Meier et al. | 370/312 |
| 2008/0285577 A1 * | 11/2008 | Zisapel et al. | 370/409 |
| 2008/0318612 A1 * | 12/2008 | Axnas et al. | 455/522 |

FOREIGN PATENT DOCUMENTS

| | | |
|---|---|---|
| CN | 1610404 | 4/2005 |
| EP | 1383353 | 1/2004 |
| EP | 1585334 | 10/2005 |
| WO | WO2005119498 | 12/2005 |

OTHER PUBLICATIONS

X Liao, H Jin, Y Liu, LM Ni, "Anysee: Peer-to-peer live streaming", 2006, IEEE Communications Society.*
International Search Report, dated Mar. 22, 2007.
Benameuer et al.: Quality of service and flow level admission control in the Internet, vol. 40, No. 1, Sep. 2002, pp. 57-71.
Kim et al.: "Measurement-based adaptive statistical admission control scheme for Video-on-Demand servers", Information networking, 2001. Proceedings 15 Int'l conference on Jan. 31, 2001-Jan. 2, 2014, pp. 471-478.
He et al.: "Network-aware multicasting for Video-on-Demand services", vol. 50, No. 3, Aug. 2004, pp. 864-869.
Cisco Systems White Paper, "Optimizing Video Transport in Your IP Triple Play Network," Mar. 2006, 13 pages.

Yanming Shen, "Peer-Driven Video Streaming Multiple Descriptions versus Layering," Polytechnic University Technical Report, Jul. 22, 2005, 13 pages.

\* cited by examiner

*Primary Examiner* — Ranodhi Serrao
(74) *Attorney, Agent, or Firm* — Robert D. Shedd; Jeffrey M. Navon

(57) ABSTRACT

A method and apparatus for performing admission control in a peer-to-peer video-on-demand system are described including determining if there is sufficient bandwidth to support leading sub-clip streaming for a new request from a video playback device, determining if there is sufficient bandwidth to admit the request without sacrificing quality of service for existing requests, accepting admission of the new request if both determining acts are positive and rejecting admission of the new request if either of the determining acts are negative. Also described is an apparatus for providing content to a video playback device in a peer-to-peer video-on-demand system including an admission control unit and a data engine component.

16 Claims, 3 Drawing Sheets

ADMISSION CONTROL FOR PERFORMANCE AWARE PEER-TO-PEER VIDEO-ON-DEMAND

This application claims the benefit, under 35 U.S.C. §365 of International Application PCT/US2006/024977, filed Jun. 27, 2006 which was published in accordance with PCT Article 21(2) on Jan. 3, 2008 in English.

FIELD OF THE INVENTION

The present invention relates to peer-to-peer networking and, in particular, to admission control of requests for video-on-demand services at the server side.

BACKGROUND OF THE INVENTION

Traditionally, the client-server service model has been used to provide streaming service. A client sends a request to a server, which then streams the content to the client if the server has enough resources to serve the client's request and there is enough bandwidth along the path between the server and the client.

Due to the limited computation and storage resource at the server and limited bandwidth in the network connecting the server and clients, scalability has been an issue with client-server streaming service. Recently, peer-to-peer techniques have been introduced into streaming service. Peers are implemented with the capabilities of clients and servers. Peer-to-peer networks alleviate the workload imposed on the server and distribute the bandwidth requirements across the network by actively caching the content and serving other peers. Studies have shown that peer-to-peer techniques greatly improve system scalability, enabling the system to serve many more users.

There have been significant efforts to address the scalability issue presented in streaming media service using peer-to-peer networking. These efforts can be classified into two categories notably peer-to-peer live streaming and peer-to-peer stored video streaming or video-on-demand. While both services strive to support a large number of users while offering users good viewing quality, they also face different technical challenges. In peer-to-peer live streaming, minimizing the start-up delay without sacrificing the system scalability is the challenge. In peer-to-peer video-on-demand service, allowing asynchronous users to share is the challenge.

Peer-to-peer streaming schemes also distinguish themselves by the different data dissemination techniques. Two data dissemination methods have been investigated—notably the overlay-based approach and the data-driven approach. In the overlay-based approach, the peers form a mesh or tree structure where parent-child relationships are formed among the peers. A child peer receives data from its parent. In contrast, the peers in the data-driven approach do not have fixed parent-child relationships. The peers look for the missing data, and retrieve the missing data wherever available. While the overlay-based approach is widely used in early peer-to-peer efforts, the data-driven approach is becoming more popular since it addresses the churn and asymmetric bandwidth problem effectively.

While most of the prior art efforts exhibit good scalability and support a greater number of users compared to a traditional client-server service model, the prior art schemes are best-effort in nature and the support of system performance requirements has not been fully investigated. Due to the limited bandwidth at the server the perceived video quality at the client side could suffer if the server over-admits clients. Hence, admission control is necessary in order to provide an expected quality of service (QoS).

SUMMARY OF THE INVENTION

A related application is directed towards a performance aware peer-to-peer video-on-demand service. That application incorporates peer-to-peer downloading into the traditional client-server video-on-demand service model. The peer-to-peer downloading carries the major data transfer load and, thus, significantly reduces the workload imposed on the server. The server thus, devotes most of its resources to providing urgent data to meet the performance requirement. The perceived performance at the client end is improved. The peer-to-peer downloading algorithm is designed with the performance requirement in mind.

Video-on-demand service allows users to select and watch video content over a network whenever they want. The related application includes a segmented peer-to-peer video sharing model that enables content sharing in a video-on-demand setting. The performance issue is addressed by incorporating a performance aware peer-to-peer data downloading algorithm and server-assisted complementary streaming that collectively realize performance similar to the performance offered by the traditional client-server service model but supporting more users.

The present invention is directed towards further improving the clients' perceived video quality by executing admission control at the server side. The server has a number of tasks/services to perform including streaming service of the leading sub-clips, performing complementary streaming and uploading content to clients/users in the peer-to-peer network. Due to the limited bandwidth resource at the server and server's responsibility to provide various services and perform various tasks, it is important to conduct admission control so that the clients' perceived video quality meets the clients' expectations.

The method and apparatus of the present invention for supporting admission control for a peer-to-peer video-on-demand service are designed to improve clients' perceived video quality in a performance aware video-on-demand service environment. The method and apparatus of the present invention monitor the current bandwidth usage and bandwidth usage history to determine if a request can be admitted into the video-on-demand system.

A method and apparatus for performing admission control in a peer-to-peer video-on-demand system are described including determining if there is sufficient bandwidth to support leading sub-clip streaming for a new request from a video playback device, determining if there is sufficient bandwidth to admit the request without sacrificing quality of service for existing requests, accepting admission of the new request if both determining acts are positive and rejecting admission of the new request if either of the determining acts are negative. Also described is an apparatus for providing content to a video playback device in a peer-to-peer video-on-demand system including an admission control unit and a data engine component.

BRIEF DESCRIPTION OF THE DRAWINGS

The present invention is best understood from the following detailed description when read in conjunction with the accompanying drawings. The drawings include the following figures briefly described below where like-numbers on the figures represent similar elements.

DETAILED DESCRIPTION OF THE PREFERRED EMBODIMENTS

Users of video-on-demand service watch different portions of video at any given moment. In order to enable the content sharing among users and maximize the amount of content that is delivered through a peer-to-peer network, it is assumed that each user has the storage capacity to cache a partial copy and/or the entire copy of content that has been played. This is a reasonable assumption given the rapidly increasing storage capacity of video playback devices used by (and synonymous with) clients/users. It should be noted that a video playback device is any device capable of receiving and playing back video (stored or live) including but not limited to computers, laptops, personal digital assistants (PDAs) and mobile devices. A peer-to-peer network is not limited to a wired line network and may be a wireless or wired line network or a hybrid network employing both wired line and wireless connections.

Previous studies have shown that the network bandwidth and the storage bandwidth are potential resource bottlenecks for a streaming server. It is assumed for the purposes of the present invention that the server is well provisioned so that the storage bandwidth is not a bottleneck. In the following discussion, the server side network bandwidth is assumed to be limited and thus, a bottleneck.

The server in a performance aware peer-to-peer streaming service environment is responsible for three types of services: (i) streaming the leading sub-clips to enable the clients to start the playback immediately (ii) uploading the video content of subsequent/following sub-clips to clients through peer-to-peer network by the server and (iii) serving complementary streaming of sub-clips to clients when there is missing data in a sub-clip and the deadline of this sub-clip is reached.

Figure 1:
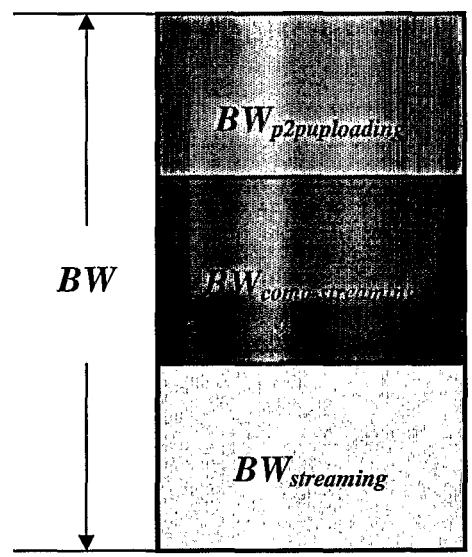
FIG. 1 shows bandwidth usage in a performance aware peer-to-peer video-on-demand service environment from the viewpoint of the server.

FIG. 1 depicts the bandwidth usage in a performance aware peer-to-peer video-on-demand streaming service environment from the point of view of the server. Herein BW is used to denote the total server bandwidth; $BW_{streaming}$ is used to denote the bandwidth used for streaming the leading sub-clips; $BW_{comp\text{-}streaming}$ is used to denote the bandwidth used for complementary streaming; and $BW_{p2puploading}$ is used to denote the bandwidth used for uploading content to the clients/users/video playback devices in the peer-to-peer network from the server. As can be seen from FIG. 1 $BW = BW_{streaming} + BW_{comp\text{-}streaming} + BW_{p2puploading}$. The definitions of important symbols are listed in Table 1 below.

TABLE 1

| Symbol | Definition |
|---|---|
| BW | Total server bandwidth |
| $BW_{streaming}$ | Bandwidth usage for streaming the leading sub-clips |
| $BW_{comp\text{-}streaming}$ | Bandwidth usage for complementary streaming |

TABLE 1-continued

| Symbol | Definition |
|---|---|
| $BW_{p2puploading}$ | Bandwidth used for uploading content to clients/users/requests in the peer-to-peer network by the server |
| $\overline{BW}_{comp\text{-}streaming}$ | Average bandwidth usage for complementary streaming |
| $\overline{BW}_{p2puploading}$ | Average bandwidth usage for uploading content to clients/users/requests in the peer-to-peer network by the server |
| $\sigma$ | Standard deviation of aggregated complementary streaming bandwidth usage |
| N | Total number of users/requests currently in the system |
| $N_{streaming}$ | The number of users/requests that receive the streamed leading sub-clips from the server |
| $N_{comp\text{-}streaming}$ | The number of users/requests that may request complementary streaming from the server |
| $\alpha$ | Weight in updating the average values of the bandwidth usage for complementary streaming and the bandwidth usage for uploading content to the clients/users by the server |
| R | Video play back rate |

Figure 2:
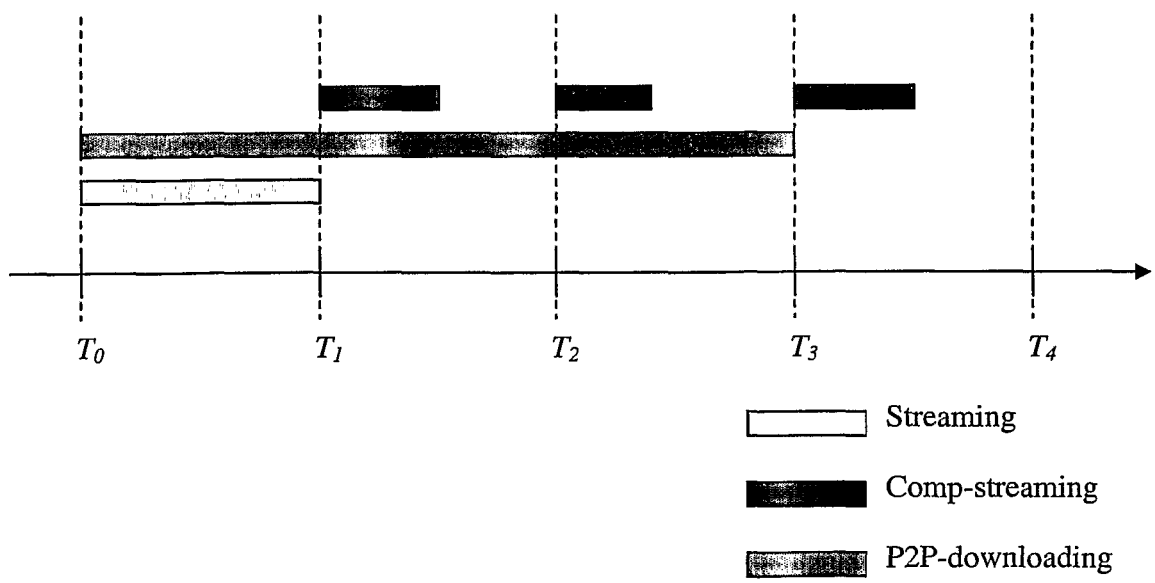
FIG. 2 is an example of bandwidth usage in the servicing of a single request for video-on-demand.

FIG. 2 is an example of server bandwidth usage in the servicing of a single request for video-on-demand. The video consists of four sub-clips and starts at time $T_0$. The content of first sub-clip is streamed. At the deadline of each following sub-clip, i.e, at time $T_1$, $T_2$, and $T_3$, complementary streaming is initiated at the playback rate to fill in the missing data. Uploading the content to the clients/users/video playback devices in the peer-to-peer network by the server starts from the beginning $T_0$ and ends at the deadline of the last sub-clip $T_3$. That is, the first (leading) sub-clip is streamed to the client. Uploading of the subsequent/following sub-clips (sub-clips 2 through 4) to the clients/users/video playback devices by the server is started at $T_0$ as well. At $T_1$, if there is any missing data for sub-clip 2, then the server begins complementary streaming of the missing data. At $T_2$, if there is any missing data for sub-clip 3, then the server begins complementary streaming of the missing data. Finally, at $T_3$, if there is any missing data for sub-clip 4, then the server begins complementary streaming of the missing data.

The characteristics of different bandwidth usage are described first. Then the method to estimate the mean and the variance of these bandwidth usages is described. Finally, the admission control scheme of the present invention is presented.

The required bandwidth to stream the leading sub-clips is a constant given by $$BW_{streaming} = N_{streaming} * r, \qquad (1)$$

where r is video playback rate, and $N_{streaming}$ is the number of users currently receiving the streaming service.

The required bandwidth to support complementary streaming is a random variable. As a sub-clip reaches its deadline, the client/user/video playback device issues a complementary streaming request if some of the data is missing. The server will perform complementary streaming of the missing data if there is sufficient bandwidth available. The missing data is transmitted/forwarded to the client at the playback rate. This guarantees that all the missing data is available before playback time. If the complementary streaming is not possible due to insufficient server bandwidth, the sub-clip will be played back with missing data and the user's viewing quality is degraded. As depicted in FIG. 2, the complementary streaming bandwidth usage can be approximated by a Bernoulli random variable. The complementary streaming rate is either r or zero.

The admission controller keeps track of the amount of data that needs to be transmitted by complementary streaming for each sub-clip. This quantity is denoted by $S_{comp\text{-}streaming}$. The average complementary streaming data rate for this sub-clip is $S_{comp\text{-}streaming}/T$, where T is the sub-clip length. The admission controller maintains the average complementary streaming bandwidth information, $\overline{BW}_{comp\text{-}streaming}$. The value of $\overline{BW}_{comp\text{-}streaming}$ is updated whenever a new average complementary streaming rate is calculated. Specifically, $$\overline{BW}_{comp\text{-}streaming} = \alpha \cdot \overline{BW}_{comp\text{-}streaming} + (1-\alpha) \cdot (S_{comp\text{-}streaming}/T) \qquad (2)$$

The weight, $\alpha$, determines how quickly the average complementary streaming bandwidth usage catches up to the current value. Experiments have shown that a value around 0.95 offers good performance results.

In order to estimate the variance of $\overline{BW}_{comp\text{-}streaming}$, a Bernoulli distribution to approximate the complementary streaming bandwidth usage is used. The variance of $\overline{BW}_{comp\text{-}streaming}$ can be computed as follows:

$$\mathrm{Var}(\overline{BW}_{comp\text{-}streaming}) = (1-\overline{BW}_{comp\text{-}streaming}) * \overline{BW}_{comp\text{-}streaming} \qquad (3)$$

The server also keeps track of the amount of data that has been transmitted to the users through the peer-to-peer network. The average server peer-to-peer downloading bandwidth, $\overline{BW}_{p2puploading}$ is updated at the deadline of the sub-clips. The amount of data uploaded for each sub-clip is denoted as $S_{p2puploading}$. The average peer-to-peer uploading rate is then $S_{p2puploading}/T$. Denoting the amount of data that is transferred to the user using the peer-to-peer network during one sub-clip length yields $$\overline{BW}_{p2puploading} = \alpha \cdot \overline{BW}_{p2puploading} + (1-\alpha) \cdot (S_{p2puploading}/T) \qquad (4)$$

The admission control process of the present invention ignores the variance of the bandwidth used for uploading the content to the clients/users/video playback devices by the server in the peer-to-peer network.

Figure 3:
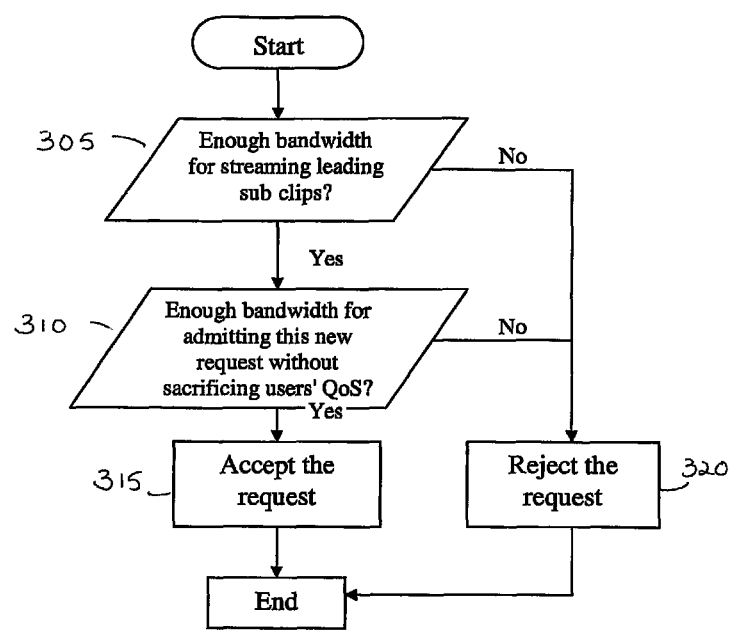
FIG. 3 is a flowchart of the admission control process from the server side.

As shown in FIG. 3, the admission control process consists of two major steps. In the first step, the admission controller determines if the server can provide good QoS to all clients with the admission of a new client request.

Step 1 (At 305). Determine if there is enough bandwidth for leading sub-clip streaming Upon the arrival of a new client request, the server must have enough bandwidth to support leading sub-clip streaming in order to admit the client. Otherwise, the client will not be able to start the playback immediately and the request has to be rejected. Therefore, the condition for admission is:

$$BW - (BW_{streaming} + BW_{comp\text{-}streaming}) > r \qquad (5)$$

The bandwidth used for uploading content to the clients/users/video playback devices by the server in the peer-to-peer network has lower priority compared to the bandwidth required for both streaming and complementary streaming. The peer-to-peer network includes many clients as well as the server. Even without the contribution from the server, a client can still download the data from other peers. Hence, the impact of the bandwidth required for uploading the content to the clients/users/video playback devices by the server in the peer-to-peer network can be ignored in this step of the admission control process. However, the bandwidth for uploading the content to the clients/users/video playback devices by the server in the peer-to-peer network is taken into account in the second step to ensure that clients' perceived quality is good and the probability that the data misses its playback deadline is low.

Step 2 (At 310). Determine if the clients' perceived QoS is good with the admission of the new client request In the second step, the collected statistics are evaluated and it is determined if the new client request can be admitted without degrading clients' viewing quality. Specifically, the following equation is used to determine if the new client request can be admitted:

$$(BW_{streaming} + r) + N_{comp\text{-}streaming}(\overline{BW}_{comp\text{-}streaming} + \beta\sigma) + N\overline{BW}_{p2pdownloading} < BW \qquad (6)$$

where $N_{comp\text{-}streaming}$ is the number of users that require complementary streaming service, $\sigma$ is the standard deviation of total complementary streaming bandwidth, and $\beta$ is the standard deviation factor.

There are three items on the left-handed side of Equation (6). The value of $BW_{streaming} + r$ indicates the amount of bandwidth required to support leading sub-clip streaming assuming the new client is admitted. In the second term, $N_{comp\text{-}streaming}$, is the number of users that may request complementary streaming. $N_{comp\text{-}streaming} = N - N_{streaming}$ since all users except those who are currently receiving leading sub-clip streaming may require the complementary streaming.

The aggregated complementary streaming bandwidth usage is the sum of $N_{comp\text{-}streaming}$ Bernoulli random variables. In accordance with the Central Limit Theorem, the sum of random variables can be approximated by a normal distribution and its standard deviation is governed by Equation (7) below. In the second step of admission control process (see Equation (6)), $\beta$ was selected to be three. For standard normal distribution, the probability that a sample deviates from its mean for more than three times the standard deviation is less than 0.005.

Hence with high probability, the users' complementary streaming requests can be satisfied. Finally, the third item is the total bandwidth required for peer-to-peer uploading service.

$$\sigma = \sqrt{\mathrm{Var}(\overline{BW}_{comp\text{-}streaming})/N_{comp\text{-}streaming}} \qquad (7)$$

In the second step, the admission controller ensures that the required bandwidth is less than the available bandwidth with high probability. Thus the users' viewing quality will not degrade with the admission of a new client request.

If either step 1 (at 305) or step 2 (at 310) fail then the request is rejected (not admitted) at 320. If both step 1 (at 305) and step 2 (at 310) are successful/pass then the request is admitted at 315.

Figure 4:
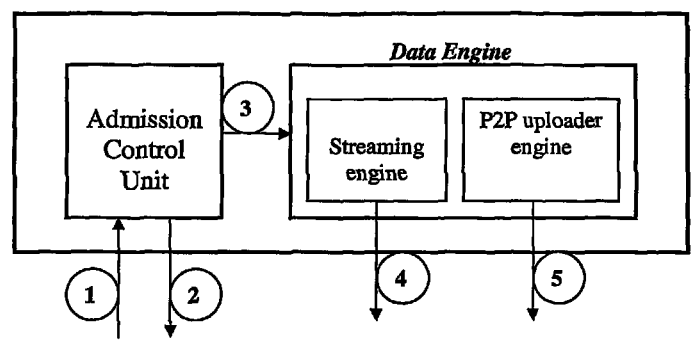
FIG. 4 is a schematic diagram of the architecture of the admission control process of the performance aware peer-to-peer streaming server.

FIG. 4 is a schematic diagram of the architecture of the performance aware peer-to-peer streaming server with the admission control component of the present invention. The data engine component has two sub-components—a streaming engine and a peer-to-peer uploader. The streaming engine handles the streaming service and the peer-to-peer engine handles the peer-to-peer uploading service. The new client request is presented to the admission controller first (step 1). Based on the outcome of the admission controller as illustrated in FIG. 1, the server returns the decision to the client (step 2). If the new client request is admitted, the admission control unit informs the data engine component of this decision (step 3). The data engine component starts to serve this request by streaming the leading sub-clips (step 4) and uploading the data of following sub-clips through the peer-to-peer downloader (step 5).

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for performing admission control in a peer-to-peer content-on-demand system, said method comprising:
determining by a processor if there is sufficient bandwidth to support leading sub-clip streaming for a new request from a playback device, comprising:
subtracting by a processor a sum of a bandwidth required for leading sub-clip streaming of said existing requests and a bandwidth required for complementary streaming for said existing requests from a total bandwidth to yield a result;
comparing by a processor said result against a playback rate;
returning by a processor an indication that there is sufficient bandwidth if said result is one of greater than and equal to said playback rate; and
returning by a processor an indication that there is insufficient bandwidth if said result is less than said playback rate;
determining by a processor if there is sufficient bandwidth to admit said request without sacrificing quality of service for existing requests; and
admitting by a processor said new request based on said first and said second determining acts.

2. The method according to claim 1, wherein said bandwidth required for leading sub-clip streaming of said existing requests is equal to said playback rate times a number of existing requests receiving streamed sub-clips from a server.

3. The method according to claim 1, wherein said second determining act further comprises:
calculating by a processor an average complementary streaming bandwidth;
calculating by a processor a standard deviation of said average complementary streaming bandwidth;
calculating by a processor an average server peer-to-peer uploading bandwidth;
calculating by a processor a first quantity, wherein said first quantity is a sum of said bandwidth required for leading sub-clip streaming from said server times said playback rate;
calculating by a processor a second quantity, wherein said second quantity is a product of a number of existing requests for complementary streaming service of sub-clips from a server times a sum of said average complementary streaming bandwidth and a standard deviation factor times said standard deviation of said average complementary streaming bandwidth;
calculating by a processor a third quantity, wherein said third quantity is a product of a total number of existing requests times said average server peer-to-peer uploading bandwidth;
summing by a processor said first quantity, said second quantity and said third quantity to yield a fourth quantity; and
comparing by a processor said fourth quantity to a total bandwidth.

4. The method according to claim 3, wherein said average complementary streaming bandwidth is equal to a sum of a previously calculated average complementary streaming bandwidth times a first weight and an average complementary streaming rate times a second weight.

5. The method according to claim 4, wherein said average complementary streaming rate is an amount of data that needs to be transmitted by complementary streaming for each sub-clip divided by a sub-clip length.

6. The method according to claim 4, wherein said second weight is the difference of 1 less said first weight.

7. The method according to claim 3, wherein said average server peer-to-peer uploading bandwidth is equal to a sum of a previously calculated average server peer-to-peer bandwidth times a first weight and an average peer-to-peer server uploading rate times a second weight.

8. The method according to claim 7, wherein said average server peer-to-peer uploading rate is an amount of data that needs to be uploaded for each sub-clip divided by a sub-clip length.

9. The method according to claim 7, wherein said second weight is the difference of 1 less said first weight.

10. The method according to claim 3, wherein said standard deviation is a square root of a variance of said average complementary streaming bandwidth divided by a number of existing requests for complementary streaming service of sub-clips from a server.

11. The method according to claim 10, wherein said variance of said average complementary streaming bandwidth is said average complementary streaming bandwidth times a difference of one less said average complementary streaming bandwidth.

12. An apparatus for performing admission control in a peer-to-peer content-on-demand system, said apparatus comprising a processor, said processor being configured to:
determine if there is sufficient bandwidth to support leading sub-clip streaming for a new request from a playback device by:
subtracting a sum of a bandwidth required for leading sub-clip streaming of said existing requests and a bandwidth required for complementary streaming for said existing requests from a total bandwidth to yield a result;
comparing said result against a playback rate;
returning an indication that there is sufficient bandwidth if said result is one of greater than and equal to said playback rate; and
returning an indication that there is insufficient bandwidth if said result is less than said playback rate;
determine if there is sufficient bandwidth to admit said request without sacrificing quality of service for existing requests; and
admit said new request based on results of said first and said second determining means.

13. The apparatus according to claim 12, wherein said bandwidth required for leading sub-clip streaming of said existing requests is equal to said playback rate times a number of existing requests receiving streamed sub-clips from a server.

14. The apparatus according to claim 13, wherein said processor determines if there is sufficient bandwidth by further:
- calculating an average complementary streaming bandwidth;
- calculating a standard deviation of said average complementary streaming bandwidth;
- calculating an average server peer-to-peer uploading bandwidth;
- calculating a first quantity, wherein said first quantity is a sum of said bandwidth required for leading sub-clip streaming from said server times said playback rate;
- calculating a second quantity, wherein said second quantity is a product of a number of existing requests for complementary streaming service of sub-clips from a server times a sum of said average complementary streaming bandwidth and a standard deviation factor times said standard deviation of said average complementary streaming bandwidth;
- calculating a third quantity, wherein said third quantity is a product of a total number of existing requests times said average server peer-to-peer uploading bandwidth;
- summing said first quantity, said second quantity and said third quantity to yield a fourth quantity; and
- comparing said fourth quantity to a total bandwidth.

15. The apparatus according to clam 12, wherein said apparatus is an admission control unit.

16. An apparatus for providing content to a playback device in a peer-to-peer content-on-demand system, comprising:
- an admission control unit comprising a processor, wherein said admission control unit performs admission control for a new request for content by said processor, by:
  - determining if there is sufficient bandwidth to support leading sub-clip streaming for a new request from a playback device;
  - determining if there is sufficient bandwidth to admit said request without sacrificing quality of service for existing requests;
  - admitting said new request if both determining acts are positive;
  - rejecting admission of said new request if either of said determining acts are negative;
  - returning a decision indicating one of acceptance and rejection of said new request for content to said playback device, wherein if said new request for content is accepted said data engine component commences servicing said new request for content by streaming leading sub-clips to said playback device via a streaming engine and uploading data of subsequent sub-clips via a peer-to-peer uploader; and
- a data engine component comprising a processor, wherein said data engine component includes a streaming engine and a P2P uploader engine.

* * * * *